United States Patent [19]

Yokogawa

[11] Patent Number: 5,471,448
[45] Date of Patent: Nov. 28, 1995

[54] TRACKING SERVO APPARATUS FOR USE IN AN OPTICAL DISK PLAYER

[75] Inventor: Fumihiko Yokogawa, Tsurugashima, Japan

[73] Assignee: Pioneer Electronic Corporation, Tokyo, Japan

[21] Appl. No.: 335,086

[22] Filed: Nov. 7, 1994

[30] Foreign Application Priority Data

Nov. 8, 1993 [JP] Japan .................................. 5-278404

[51] Int. Cl.⁶ .................................................. G11B 7/095
[52] U.S. Cl. .................................. 369/44.29; 369/44.28; 369/44.34
[58] Field of Search ........................... 369/44.36, 44.25, 369/44.27, 44.29, 44.26, 54, 44.28; 250/201.5

[56] References Cited

U.S. PATENT DOCUMENTS 4,980,877  12/1990  Sugiyama et al. .................. 369/44.41
5,012,460  4/1991  Popovich et al. .................... 369/44.34
5,295,131  3/1994  Ishibashi et al. .................... 369/44.26

*Primary Examiner*—Aristotelis Psitos
*Assistant Examiner*—Thang V. Tran
*Attorney, Agent, or Firm*—Perman & Green

[57] ABSTRACT

A tracking servo apparatus for an optical disk player enables a braking operation to rapidly draw into tracking servo control even in case of a double density track. The tracking servo apparatus generates an odd/even discrimination signal indicating on which of an odd number track or an even number track a position for reading information by a pick is currently present, samples a tracking error signal according to an edge position of the odd/even discrimination signal, selectively outputs either a positive or a negative section of the tracking error signal according a polarity of the sampled tracking error signal as a brake signal to a driving means for a tracking actuator, and thus draws the position for reading information by a pick-up onto a track which can be put under tracking servo control.

3 Claims, 6 Drawing Sheets

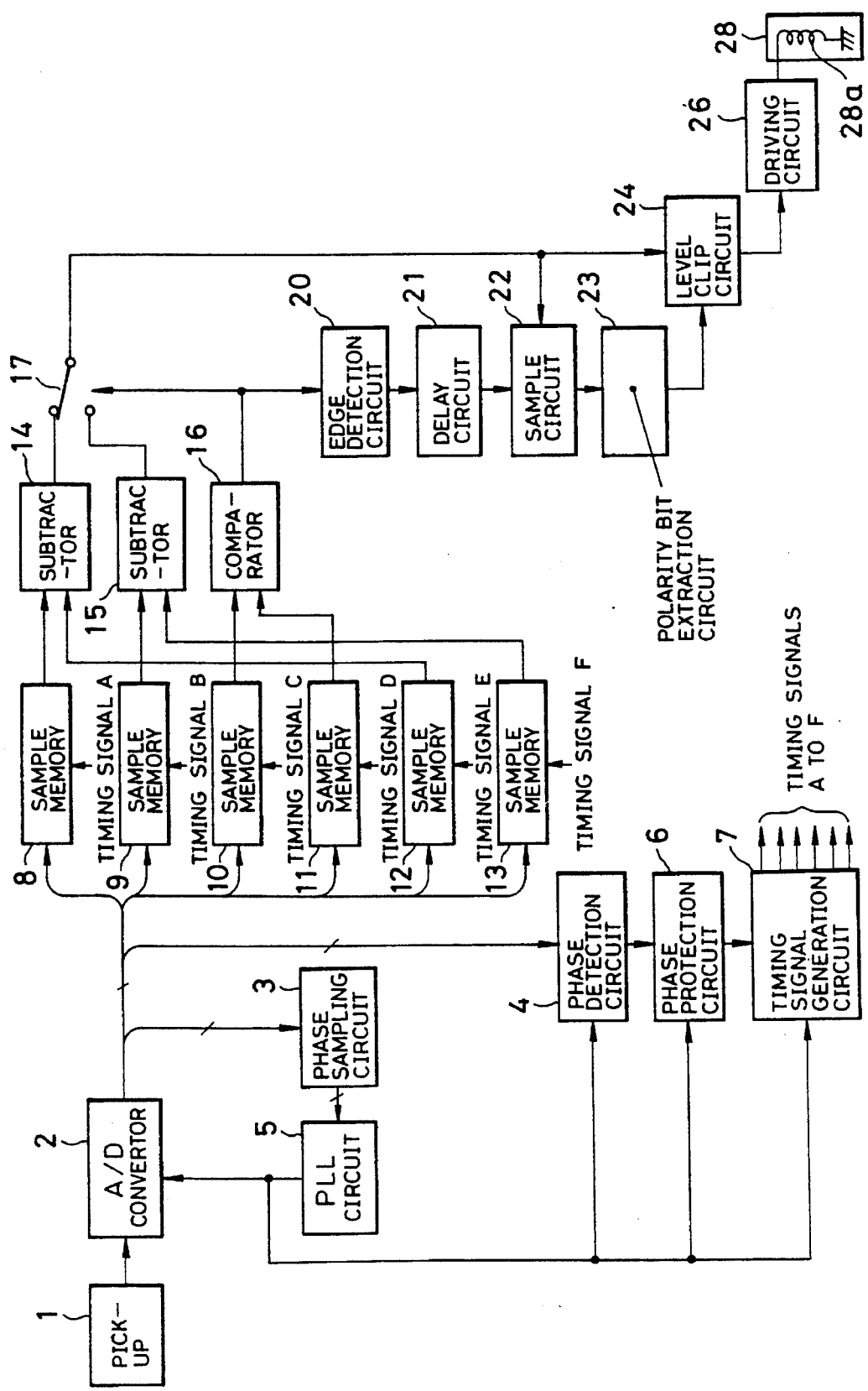

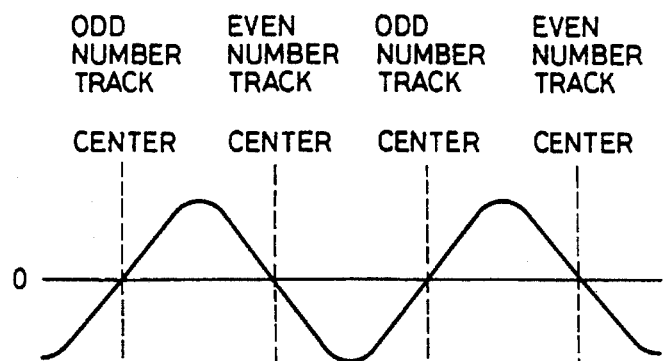
FIG.3A
FIG.3B
FIG.3C
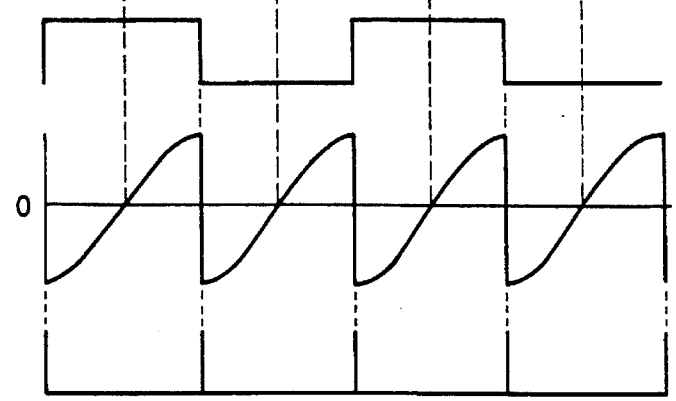
FIG.3D
FIG.3E
FIG.3F
FIG.3G
FIG.3H

FIG. 4G  HIGH LEVEL

FIG.5A
FIG.5B
FIG.5C
FIG.5D
FIG.5E
FIG.5F
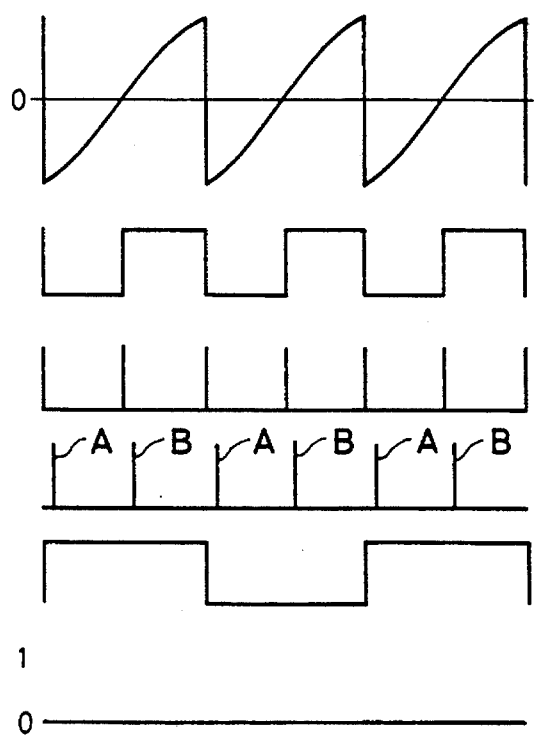
FIG.6A
FIG.6B
FIG.6C
FIG.6D
FIG.6E
FIG.6F
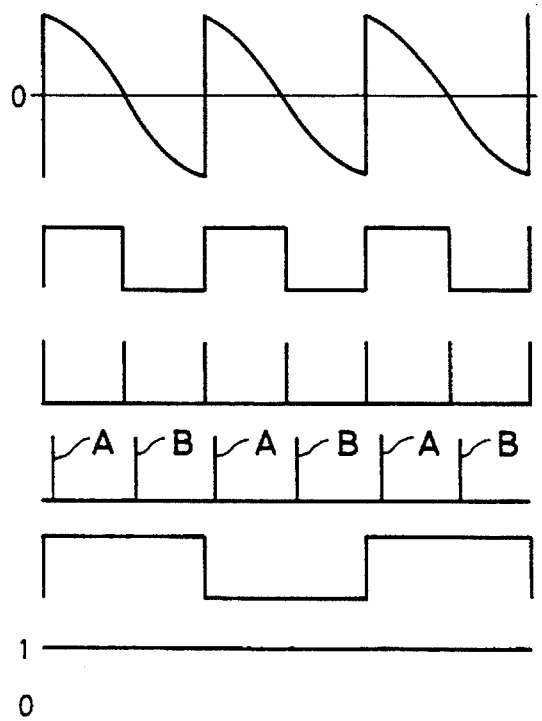

TRACKING SERVO APPARATUS FOR USE IN AN OPTICAL DISK PLAYER

BACKGROUND OF THE INVENTION

1. Field of the Invention

The present invention relates to a tracking servo apparatus for use in an optical disk player.

2. Description of Background Information

Because of the so-called eccentricity which is a displacement of a center of a disk itself from a center of a track formed on the disk, the relative position of an irradiation spot which is a position for reading information by a pick-up is always displaced from that of a track in the radial direction of the disk. To apparently eliminate the relative positional displacement in the radial direction of a disk, a tracking servo apparatus is used so that a pick-up can always follow a track accurately.

The tracking servo apparatus generally has means for generating a tracking error signal having a level and a polarity each corresponding to a distance between a pick-up and a track as well as to the direction thereof, and moves and controls a position of an irradiation spot by a pick-up in the radial direction of a disk by way of forming a tracking servo loop by driving a tracking actuator inside the pick-up according to the tracking error signal. If an eccentric disk is rotated in a case where, for instance, an operation of a disk player is started, a traversing frequency of a track viewed from the pick-up may surpass at maximum 10 KHz. In contrast, a bandwidth of tracking servo is in a range from 500 Hz to around 2.5 KHz, and even if a bandwidth of tracking servo is switched between the drawing mode in which a tracking servo loop is closed and the tracing mode, drawing is difficult when a traversing frequency of the track is high. There is a method of monitoring a tracking error signal frequency and drawing into tracking servo control when the frequency becomes lower, and this method is based on the fact that a traversing frequency becomes lower 2 times for each one rotation of a disk. However, in this method, a long time is required before drawing is started, and drawing is delayed disadvantageously.

To solve this problem, a braking operation is often carried out to lower a relative speed by moving an irradiation stop in the traverse direction for the purpose to draw a tracking servo rapidly even when the frequency of traversing the track is high.

In a conventional type of tracking servo apparatus, an envelope component of an RF signal which is a read signal read by a pick-up from a disk is obtained, the envelope component and the tracking error signal are converted to binary values respectively, the envelope component converted to a binary value is sampled at an edge of the tracking signal also converted to a binary value and the sampled envelope component is maintained until the next edge to generate a tracking gate signal. Switching of a tracking servo loop is controlled according to the tracking gate signal, and either one of the polarity sections of the tracking error signal is selected, the selected one polarity section give effects to a tracking actuator as a brake signal corresponding to the traversing direction of an irradiation spot. With the braking operation as described above, the tracking servo loop is set to a closed state when a frequency of the tracking servo signal goes down below a frequency allowing drawing, and tracking servo control is executed. A tracking servo apparatus having the configuration as described above is disclosed, for instance, in Japanese Patent Kokoku No. 63-4271 or in Japanese Patent Kokoku No. 1-54794.

However, when a double density track disk is used as an optical disk, an adjacent track is included in an irradiation spot, a level of an RF signal becomes substantially equal regardless of whether an irradiation spot is on a ON track or on an OFF track, and an envelope component of the RF signal little changes, which makes it impossible to execute a braking operation using an envelop component of an RF signal.

SUMMARY OF THE INVENTION

It is an object of the present invention to provide a tracking servo apparatus which enables a braking operations to rapidly execute drawing into tracking servo control even in a double density track optical disk.

A tracking servo apparatus according to the present invention comprises generating means for generating a tracking error signal indicating a displacement of a position for reading information by a pick-up from a track in the radial direction of the disk on an optical disk, switching relay means for outputting a brake signal according to an instruction for drawing and relaying and outputting a tracking error signal in place of a brake signal in correspondence to a drop of a frequency of the tracking error signal, and driving means for driving a tracking actuator provided in the pick-up so that a position for reading information is positioned on a track according to an output signal from the switching relay means, wherein the switching relay means comprises an odd/even discriminating means for generating an odd/even discrimination signal indicating on which of an odd number track or an even number track a position for reading information is currently located, means for detecting an edge of the odd/even discrimination signal and generating an edge pulse, sampling means for sampling a tracking error signal according to the edge pulse, and means for selectively outputting either a positive or negative portion of a tracking error according to a polarity of the tracking error signal sampled by the sampling means.

In the tracking servo apparatus according to the present invention, an odd/even discrimination signal indicating on which of an odd number track or an even number track a position for reading information by a pick-up is currently present is generated, a tracking error signal is sampled according to a position of an edge of the odd/even discrimination signal, either a positive or negative section of the tracking error signal is selectively outputted as a brake signal to the tracking actuator driving means according to a polarity of the sampled tracking error signal, and a position for reading information by a pick-up is drawn onto a track which can be controlled by the tracking servo apparatus.

BRIEF DESCRIPTION OF THE DRAWINGS

FIG. 2 is a block diagram illustrating an embodiment of the present invention;

FIG. 3A to FIG. 3H are views each illustrating signal waveform in each section of the tracking servo apparatus when traversing against the forward direction;

FIG. 4A to FIG. 4H are views each illustrating signal waveform in each section of the tracking servo apparatus when traversing in the reverse direction;

FIG. 5A to FIG. 5F are views each illustrating signal waveform when traversing in the forward direction in a case where another method of obtaining a direction discrimination signal is employed;

FIG. 6A to FIG. 6F are views each illustrating signal waveform when traversing in the reverse direction in a case where other method of obtaining a direction discrimination signal is employed.

DETAILED DESCRIPTION OF THE PREFERRED EMBODIMENTS

Detailed description is made hereinafter for preferred embodiments of the present invention with reference to the related drawings.

Figure 1:
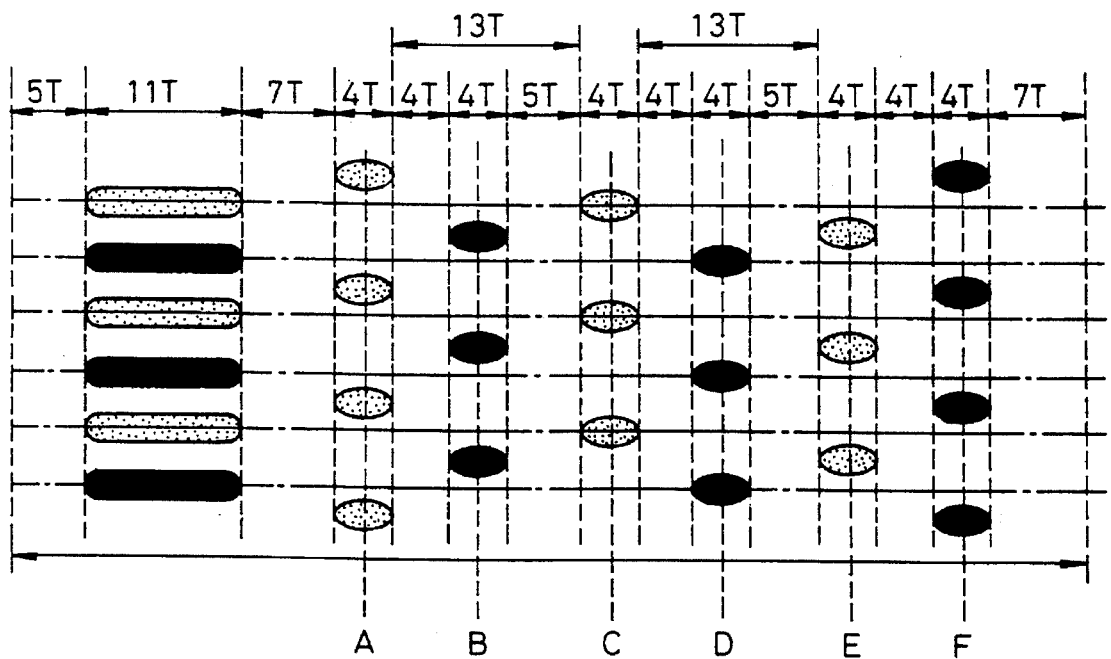
FIG. 1 is a view illustrating a servo field of a CAV type of double density optical disk.

FIG. 1 shows a pit formed in a servo field of a CAV (Constant Angular Velocity) type of optical disk for double density recording. In the disk, a servo field is formed as a pre-pit in each segment of each track. In FIG. 1, each track is formed with a space of, for instance, 0.4 μm. There is a synchronization pit with the length of 11 T (T: 1 bit space) at the head of a segment in each track, and a plurality of pits are formed behind that for tracking servo. In an odd number track, as shown as dark tone pits in FIG. 1, a first tracking pit having a length of 4 T is located with a space of 15 T from a rear edge of the synchronization pit as a wobble pit in the left side from a track center in the direction toward the rear edge of the segment, and furthermore a clock pit with a length of 4 T is located on a track by 13 T afar from a rear edge of the first tracking pit. Furthermore a second tracking pit with a length of 4 T is located as a wobble pit with a space of 13 T from a rear edge of the track pit against a rear edge of the segment in the right side from a track center. In an even number track, as shown by light tone pits in FIG. 1, a first tracking pit with a length of 4 T is located with a space of 7 T from a rear edge of the synchronization pit as a wobble pit against a rear edge of a segment in the left side from a track center, and a clock pit with a length of 4 T is located on the track with a space of 13 T from a rear edge of the first racking pit. Furthermore a second tracking pit with a length of 4 T is located as a wobble pit with a space of 13 T from a rear edge of the clock pit against a rear edge of the segment in the right side from the track center. A wobble pit is formed around a position for instance 0.2 μm afar from the track center. Behind the servo field as described above is located a data field (not shown herein). The tracking servo apparatus shown in FIG. 2 is provided in a disk player (not shown) for replaying a disk having the servo field as shown in FIG. 1. In this tracking servo field, a light beam for reading information is irradiated from a pick-up 1 onto the disk, and an RF (high-frequency wave) signal, which is a read signal read from the disk by the pick-up 1 is supplied to an A/D convertor 2. The RF signal is converted to a digital RF signal in the A/D convertor 2, and then is supplied to a phase sample circuit 3 as well as to a synchronism detection circuit 4. The phase sample circuit 3 obtains from a difference between sample values before and after a clock pit waveform from the digital RF signal. A PLL circuit 5 is connected to the phase sample circuit 3, which regenerates a clock signal from the phase information. This clock signal is supplied as a sampling signal to the A/D convertor.

The synchronism detection circuit 4 detects a synchronism pit from an output RF signal from the A/D convertor 2. In this synchronism detection circuit 4, a synchronization pit is detected based on the fact that a lit length of a synchronization pit is longer than a maximum length pit among data pits. A synchronism protection circuit 6 is connected to the synchronism detection circuit 4, and it generates a reference timing signal depending on a time point of detecting a synchronization pit by the synchronism detection circuit 4 as a reference. The reference timing signal is supplied to a timing signal generating circuit 7. A clock signal from the PLL circuit 5 is supplied to the synchronism detection circuit 4, synchronism protection circuit 6 and timing signal generating circuit 7, and these circuits work synchronizing to this clock signal.

The timing signal generating circuit 7 generates 6 types of timing signals A to F according to a reference timing signal. A time point of generation of a timing signal A corresponds to a position by 9 T afar from a rear edge of a synchronization pit, a timing point of generation of a timing signal B corresponds to a position by 8 T afar from the time point of generation of the timing signal A, a time point of generation of a timing signal C corresponds to a position by 9 T afar from the time point of generation of the timing signal B, a time point of generation of a timing signal D corresponds to a position by 8 T afar from the time point of generation of the timing signal C, a time point of generation of a timing signal E corresponds to a position by 9 T afar from the time point of generation of the timing signal D, and a time point of generation of a timing signal F corresponds to a position 8 T afar from the time point of generation of the timing signal E. Namely as indicated by the signs A to F in FIG. 1, the timing signal A is generated when an irradiation spot of a light beam from the pick-up 1 is in the radial direction of a disk including a first tracking pit of an even number track, the timing signal B is generated when the irradiation spot is located in the radial direction of a disk including a first tracking pit of an odd number track, the timing signal C is generated when the irradiation spot is located in the radial direction of a disk including a clock pit of an even number track, the timing signal D is generated when the irradiation spot is located in the radial direction of a disk including a clock pit of an odd number track, the timing signal E is generated when the irradiation spot is located in the radial direction of a disk including a second tracking pit of an even number track, and the timing signal F is generated when the irradiation spot is located in the radial direction of a disk including a second tracking pit of an off number track.

Furthermore, 6 pieces of sample memory 8 to 13 are connected to the A/D converter. So that each of the sample memories 8 to 13 decides a time point for storing an output signal from the A/D convertor 2, the timing signal A is supplied to the sample memory 8, the timing signal B to the sample memory 9, the timing signal C to the sample memory 10, the timing signal D to the sample memory 11, the timing signal E to the sample memory 12, and the timing signal F to the sample memory 13. Each of the sample memories 8 to 13 stores an output signal from the A/D convertor 2 according to a timing signal, and outputs the stored signal until a new signal to be stored therein is supplied.

A subtractor 14 is connected to an output terminal of each of the sample memories 8, 12, while a subtractor 15 is connected to an output terminal of the sample memory 13. The subtractor 14 subtracts an signal stored in and outputted from the sample memory 12 from a signal stored in and outputted from the sample memory 8. The subtractor 15 subtracts a signal stored in and outputted from the sample memory 13 from a signal stored in and outputted from the sample memory 9. A comparator 16 is connected to an output terminal of each f the sample memories 10, 11. The comparator 16 compares signal levels stored in the sample memories 10, 11 to each other, and generates an odd/even discrimination signal indicating which of an odd or even number track the current track is depending of a result of comparison. This odd/even discrimination signal becomes high in an odd number track section, and becomes low in an even number track section.

A selection switch 17 is connected to an output terminal of each of the subtractors 14, 15. This selection switch 17 selectively relays either one of output signals from the subtractor 14 or subtractor 15 to a level clip circuit 24 described later. A signal relayed and outputted from the selection switch 17 is a tracking error.

An edge detection circuit 20 is connected to an output terminal of the comparator 16. The edge detection circuit 20 detects an edge of an odd/even discrimination signal, and generates a pulse signal having a specified bandwidth when an edge is detected. A sample circuit 22 is connected to the edge detection circuit 20 via a delay circuit 21. The delay circuit 21 supplies an output signal from the edge detection circuit 20 delaying it by a specified short period to the sample circuit 22. The sample circuit 22 samples a tracking error signal according to the delayed pulse signal. A polarity bit extraction circuit 23 is connected to the sample circuit 22, and in this polarity bit extraction circuit 22 is extracted a polarity bit of the sample tracking error. An output signal from the polarity bit extraction circuit 23 is a direction discrimination signal indicating a direction of movement when traversing a track, and the direction discrimination signal is supplied to the level clip circuit 24. The level clip circuit 24 normally outputs a tracking error signal as it is, but when an instruction for drawing is generated, clips and outputs a positive section or a negative section of the tracking error signal according to contents of a direction discrimination signal. An output signal from this level clip circuit 24 becomes a brake signal when drawing into tracking servo control. It should be noted that the specified short time is a delay time required only to accurately discriminate a polarity of a tracking error signal in the polarity bit extraction circuit 23 because inversion of a polarity of a tracking error signal and inversion of an odd/even discrimination signal occur simultaneously.

A driving circuit 26 is connected to an output terminal of the level clip circuit 24. The driving circuit 26 drives a tracking actuator in the pick-up 1 according to a level of a signal supplied thereto. In the tracking actuator 28, an electric current flows in a driving coil 28a, which generates a force driving an object lens toward a spring not shown herein in the radial direction of a disk.

It should be noted that an instruction for drawing is generated, for instance, by a system controller (not shown) which controls the entire disk player.

With the configuration as described above, an RF signal read out by the pick-up 1 from a disk is converted to a digital signal by the A/D convertor 2, and is supplied to the sample memories 8 to 13. When the timing signal A is outputted from the timing signal generating circuit 7, namely when an irradiation spot by the pick-up 1 is present in the radial direction including a first tracking pit of an even number track, the digital RF signal then is stored in the sample memory 8. When the timing signal B is outputted, namely when an irradiation spot by the pick-up 1 is present in the radial direction of a disk including a first tracking pit of an odd number track, the digital RF signal then is stored in the sample memory 9. Also when the timing signal C is outputted, namely when an irradiation spot by the pick-up 1 is present in the radial direction of a disk including a clock pit of an even number track, the digital RF signal then is stored in the sample memory 10. When the timing signal D is outputted, namely when an irradiation spot by the pick-up 1 is present in the radial direction of a disk including a clock pit of an odd number track, the digital RF signal then is stored in the sample memory 11. When the timing signal E is outputted, namely when an irradiation spot by the pick-up 1 is present in the radial direction of a disk including a second pit of an even number track, the digital RF signal then is stored in the sample memory 12. Furthermore, when the timing signal F is outputted, namely when an irradiation spot by the pick-up 1 is present in the radial direction of a disk including a second tracking pit of an odd number track, the digital RF signal then is stored in the sample memory 13.

Levels of RF signals stored in the sample memory 8, and sample memory 12 respectively are levels corresponding to the first and second tracking pints of an even number track respectively, and if the irradiation spot by the pick-up 1 is on a track center, the two levels are identical. As an irradiation spot by the pick-up 1 goes further from the track center in any radial direction, a level of an RF signal getting closer to the tracking pit becomes larger. For this reason, the subtractor 14 subtracts a signal stored and outputted in the sample memory 12 from a signal stored in and outputted from the sample memory 8 to obtain a first sinusoidal wave signal as shown in FIG. 3A. Similarly, levels of RF signals stored in the sample memories 9, 13 respectively are levels corresponding to the first and second tracking pits of an odd number track respectively, and if the irradiation spot by the pick-up 1 is present on the track center, the two levels are identical. The subtractor 15 subtracts a signal stored in and outputted from the sample memory 13 from a signal stored in and outputted from the sample memory 9 to obtain a second sinusoidal signal having a reverse phase to the first sinusoidal wave signal as shown in FIG. 3B.

Levels of RF signals stored in the sample memories 10, 11 respectively are levels corresponding to clock pits of an even number track and an odd number track respectively, and if the irradiation spot by the pick-up 1 is present on a center of an even number track, a level of the RF signal stored in the sample memory 10 is maximum, while a level of the RF signal stored in the sample memory 11 is minimum. On the contrary, if the irradiation spot by the pick-up 1 is present on a center of an odd number track, a level of the RF signal stored in the sample memory 10 is maximum, while a level of the RF signal stored in the sample memory 11 is maximum. If the irradiation spot by the pick-up 1 is present at a middle point between a center of an even number track and a center of an odd number track, levels of the stored signals are identical. Levels of signals stored in the sample memories 10, 11 are compared to each other in the comparator 16, so that an odd/even discrimination signal indicating a result of comparison goes high in a range in which the irradiation spot by the pick-up 1 goes from a middle point between a center of an even number track and a center of an odd number track via an odd number track to the next middle point between tracks, and goes low in a range where the irradiation spot moves from middle point between tracks via an even number track to the next middle point between tracks.

When the odd/even discrimination signal is high, the switch 17 relays the first sinusoidal wave signal which is an output signal from the subtractor 14, and when the odd/even discrimination signal is low, the switch 17 relays the second sinusoidal wave signal which is an output signal from the subtractor 15. For this reason, as shown in FIG. 3D, the first and second sinusoidal wave signals are alternately switched by the switch 17 at each edge of a tracking discrimination signal as shown in FIG. 3D, and the signal is outputted as a tracking error signal via the level clip circuit 24 to the driving circuit 26. The driving circuit 26 drives the tracking actuator 28 so that a level of the tracking error signal will become zero.

Figures 4A, 4B, 4C, 4D, 4E, 4F, 4H:
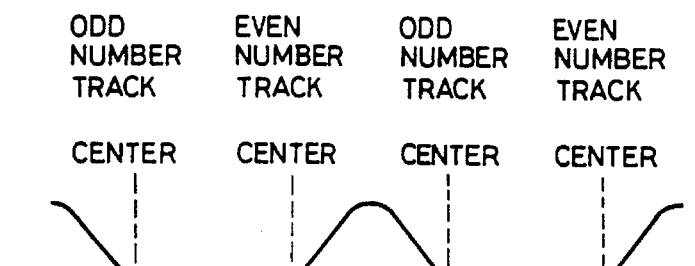

It should be noted that the waveforms shown in FIG. 3A to FIG. 3D show a case in which an irradiation spot by a pick-up moves in the forward direction, namely the inner periphery to the outer periphery of a disk, and when the irradiation spot by a pick-up 1 moves in the reverse direction, namely from the outer periphery to the inner periphery of a disk, the first sinusoidal wave signal has a phase reverse to that when moving in the forward direction as shown in FIG. 4A, and also the second sinusoidal wave signal is as shown in FIG. 4B. The odd/even discriminating signal is obtained as shown in FIG. 4C, so that a tracking error signal has a phase reverse to that when moving in the forward direction as shown in FIG. 4D.

When an irradiation spot by the pick-up 1 goes across a track, a track is switched from an even number one to an odd number one or vice versa, so that contents of an odd/even discrimination signal changes. For this reason, the edge detection circuit 20 detects an edge of an odd/even discrimination signal, and generates an edge detection pulse signal having a specified bandwidth as shown in FIG. 3E or in FIG. 4E. The edge detection pulse signal is delayed by the delay circuit 21 as shown in FIG. 3F or in FIG. 4F, and then is supplied to the sample circuit 22. The sample circuit 22 samples a tracking error signal according to the delayed pulse signal. A polarity bit of the sampled tracking error signal is extracted as a low level or a high level by the polarity bit extraction circuit 23 as shown in FIG. 3G or in FIG. 4G. For this reason, an output signal from the polarity bit extraction circuit 23 is a direction discrimination signal indicating a direction of movement of an irradiation spot by the pick-up 1. In this case, if the direction discrimination signal is low, the signal indicates movement in the forward direction, and if the signal is high, the signal indicates traversing movement in the reverse direction.

Figure 7A:
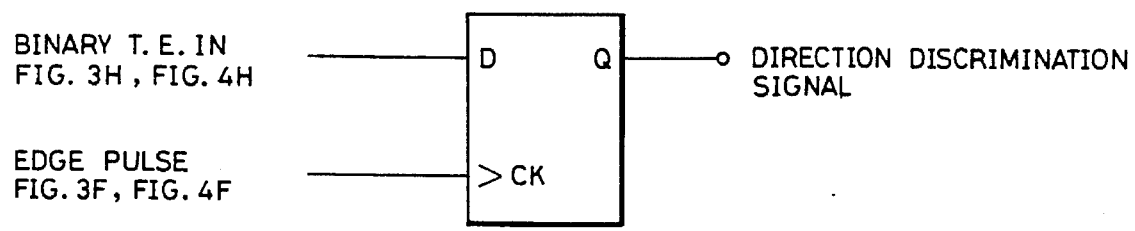
FIG. 7A and FIG. 7B are views illustrating an example of a circuit to discriminate the forward direction from the reverse direction respectively.
Figure 7B:
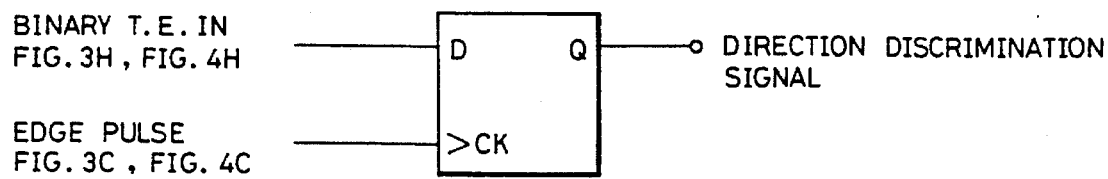

It should be noted that, although a polarity of is discriminated by sampling the tracking error signals shown in FIG. 3D and FIG. 4D, but as shown in FIG. 3H and FIG. 4H, a tracking error signal may be converted to a binary signal and sampled with a D-flip-flop shown in FIG. 7A and FIG. 7B to determine the polarity for the purpose to use the tracking error signal as a direction discrimination signal.

The direction discrimination signal is supplied to the level clip circuit 24. The level clip circuit 24 outputs a tracking error signal as it is until an instruction for drawing is generated. However, when an instruction for drawing is generated, a positive or a negative section of the tracking error signal is clipped and outputted according to contents of the direction discrimination signal. Namely, if the direction discrimination signal indicates traversing movement in the forward direction, a positive section of a tracking error signal is clipped and a negative section thereof is outputted, and if the direction discrimination signal indicates traversing movement in the reverse direction, a negative section of the tracking error is clipped and a positive section thereof is outputted.

For this reason, when an irradiation spot by the pick-up 1 moves, traversing a track, in the forward direction, a tracking error signal comprising only a negative section is supplied to the driving circuit 26. If an irradiation spot by the pick-up 1 moves, traversing a track, in the reverse direction, a tracking error signal comprising only a positive section is supplied to the driving circuit 26. The tracking error comprising only a positive section or only a negative section works as a brake signal to the tracking actuator 28. With this operation, a relative speed between an irradiation spot and a track becomes lower, and the level clip circuit 24 outputs a tracking error signal as it is when a frequency of the tracking error signal drops to a level allowing drawing or below, and the tracking servo loop is closed.

Although not shown herein, a frequency of a tracking error signal is detected, the frequency is converted to a voltage by a frequency/voltage convertor, and the voltage is compared to a specified voltage by a comparator, thus the fact that the tracking error has reached a level allowing drawing being detected. Namely the tracking error shown in FIG. 5A or FIG. 6A is converted to a binary value to obtain a binary signal as shown in FIG. 5B or FIG. 6B, then an edge pulse indicating the edge is generated (as shown in FIG. 5C or FIG. 6C), the edge pulse signal is delayed as shown in FIG. 5D or FIG. 6D to use an edge closer to an edge of the odd/even discrimination signal (Refer to FIG. 5E or FIG. 6E) as pulse A and that further therefrom as pulse B, the tracking error signal is sampled according to the pulse A or pulse B to compare which of the sampled values is larger or smaller than the remaining one, thus a direction discriminating signal (as shown in FIG. 5F or FIG. 6F) being obtained.

It should be noted that, although description of the embodiments above assumes that a double density recording optical disk is used a an optical disk, the present invention can be applied to a case where a single density recording optical disk is used.

Furthermore it should be noted that, although description of the embodiments above assumes that the present invention is applied to a tracking servo apparatus based on a tracking servo apparatus, the present invention can be applied also to a tracking servo apparatus based on a push-pull system.

As described above, in the tracking servo apparatus according to the present invention, an odd/even discrimination signal indicating on which of an odd number track or an even number track a position for reading information by a pick-up is currently located is generated, a tracking error signal is trampled according to an edge position of the odd/even discrimination signal, either one of a positive or a negative section of the tracking error signal is selectively outputted as a brake signal to a tracking actuator driving means according to a polarity of the sampled tracking error signal, thus a position for reading information by a pick-up being drawn onto a track which can be controlled by the tracking servo apparatus. For this reason, a brake signal corresponding to a direction of track traversing movement can be obtained from a tracking error signal without using an envelope signal of a read RF signal, so that, even when a double density track disk is used as an optical disk, a braking operation for rapidly drawing into tracking servo control can be executed. Also, even in case of a disk with a variable track pitch, a braking operation corresponding to the moving direction can be executed irrespective of a zero-cross point of a tracking error signal.

What is claimed is:

1. A tracking servo apparatus for use in an optical disk player having:

generating means for generating a tracking error signal indicating a displacement between a position for reading information by a pick-up and a track in the radial direction of an optical disk;

switching relay means for outputting a brake signal according an instruction for drawing, and relaying and outputting said tracking error signal in place of said brake signal in correspondence to a drop of a frequency of said tracking error signal;

driving means for driving a tracking actuator provided in said pick-up so that said position for reading information is located on a track according an output signal from said selective relay switch, wherein said switching relay means comprises:

odd/even discriminating means for generating an odd/even discrimination signal indicating on which of an odd number track or an even number track said position for reading information is currently present;

means for detecting an edge of said odd/even discriminating signal and generating an edge pulse;

sampling means for sampling said tracking error signal according to said edge pulse; and means for selectively outputting either a positive or a negative section of said tracking error signal according to a polarity of the tracking error signal sampled by said sampling means as said brake signal.

2. A tracking servo apparatus according to claim 1, wherein said optical disk has a recording format based on a sampled servo system with a track identifying pit indicating which of odd number track or an even number track the current track is formed together with a wobble pit for a tracking servo operation in a servo field of each track preformatted, and said odd/even discriminating means generates said odd/even discrimination signal according to a read signal to said track identifying pit by said pick-up.

3. A tracking servo apparatus according to claim 1, further comprising delay means for delaying and supplying said edge pulse to said sampling means.

\* \* \* \* \*